United States Patent
Konson et al.

(10) Patent No.: US 7,269,684 B2
(45) Date of Patent: Sep. 11, 2007

(54) METHOD AND SYSTEM FOR PERSISTENTLY STORING OBJECTS IN AN OBJECT ORIENTED ENVIRONMENT

(75) Inventors: Konstantin Konson, Boeblingen (DE); Alexander Terekhov, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 09/928,881

(22) Filed: Aug. 13, 2001

(65) Prior Publication Data

US 2002/0062419 A1 May 23, 2002

(30) Foreign Application Priority Data

Sep. 29, 2000 (EP) .............................. 001 21 505

(51) Int. Cl.
*G06F 12/00* (2006.01)
(52) U.S. Cl. .......................................................... 711/5
(58) Field of Classification Search ................ 711/5
See application file for complete search history.

(56) References Cited

U.S. PATENT DOCUMENTS 5,752,243 A * 5/1998 Reiter et al. ................... 707/3

* cited by examiner

Primary Examiner—Matthew Kim
Assistant Examiner—Sheng-Jen Tsai
(74) Attorney, Agent, or Firm—Michael J. Buchenhorner; Casey P. August

(57) ABSTRACT

A method and a system is provided for persistently storing and restoring objects of an object oriented environment established on a computer system having a volatile memory and a persistent storage. Pieces of memory, referred to as segments are allocated in the volatile memory. Then, a first list is created that contains first references to said segments. The segments are further divided into blocks. The blocks are indicated by second references. The second references are stored in a second list. In order to store an object present in the volatile memory, a block is allocated. Then an object description is created by saving the object's values of its variables. After saving the object description in the allocated block, a new element is added to the second list containing the particular reference to said created object description. Then, the references of the object descriptions of all other objects referenced in the present object are determined. These references to other objects are stored in the created object descriptions by setting the address of said referenced object description as the reference in the created object description. Finally, the second list, the segments referenced by the first list and the first list are stored on said persistent storage.

24 Claims, 4 Drawing Sheets

METHOD AND SYSTEM FOR PERSISTENTLY STORING OBJECTS IN AN OBJECT ORIENTED ENVIRONMENT

BACKGROUND OF THE INVENTION

1. Field of the Invention

The present invention is related to a mechanism for storing and retrieving dynamically changing data. Particularly, the present invention is related to a method and system for persistently storing objects of an object oriented environment and restoring such objects respectively.

2. Description of the Related Art

An object oriented environment provides all necessary mechanisms, tools and functionality to realize a method and system according to the concepts of object oriented design. Object oriented design is a design method in which a system is modeled as a collection of cooperating objects wherein individual objects are treated as instances of a class within a class hierarchy. Four stages can be identified in object oriented design, i.e., identifying the classes and objects, their semantics, their relationships and specifying class and object interfaces and implementation. Object-oriented design is one of the stages of object-oriented programming.

In object-oriented programming the expression "object" refers to a unique instance of a data structure defined according to a template provided by its class. Each object has its own values for the variables belonging to its class and can respond to the messages and methods defined by its class.

A class, on the other hand, is a prototype for an object in an object-oriented language, analogous to a derived type in a procedural language and may also be considered to be a set of objects which share a common structure and behavior. The structure of a class is determined by the class variables which represent the state of an object of that class whereas the behavior is given by a set of methods associated with the class.

Classes are related in a class hierarchy. One class may be a specialization, a so called "subclass" of another or it may be composed of other classes or it may use other classes in a client-server relationship.

The state of an object is its configuration, attributes, condition, or information content. The state of an object is usually temporary, i.e. it changes with time, and is volatile, i.e., it will be lost or reset to some initial state, if a system running in an object oriented environment is switched off. Therefore, there is a major need for mechanisms to store the state of an object persistently in a way that a new object having the particular state can be created at any time. In other words, a concept needs to be implemented where created objects and variables continue to exist and retain their values between runs of the system.

To improve readability, in the following, the expression "to store an object" will be used synonymously to the expression "to store the state of an object".

During operation of a system running in an object oriented environment multiple objects get created, modified and deleted. In many cases existing objects need to be available after the termination of the system's operation and a restart of the system respectively. In order to extend the availability of an object beyond the operation of the respective system, the object needs to be saved to a persistent storage, i.e., a device into which data can be entered, in which they can be held, and from which they can be retrieved at a later time, such as a tape, a floppy, a hard drive or some optical storage. However, the data structure used to access the persistent storage might also differ. It can be organized like a data base, files, queues or directories.

More generally, in order to provide persistency in an object oriented environment a persistent medium is required, i.e., the medium in which the objects get stored. Such a persistent medium can be formed, e.g., by a data base, files, queues or directories. Between the objects which reside in a volatile memory during operation of the system and the persistent medium an intermediate layer is required that functions as an adapter. This adapting layer will be called "persistent data layer". It is the task of the persistent data layer to conduct the storing and recreating of the objects persistently stored in the persistent medium.

In a known concept for persistently storing objects all objects to be stored get serialized into a stream and saved on the persistent medium. This concept, however, realizes a static persistence, i.e., after storing the objects loose their accessibility. New objects cannot be added to the stream, obsolete objects cannot be deleted and changed objects cannot be altered directly in the stream stored on the persistent medium.

A more flexible way of persistently storing objects is by using an object oriented database, i.e., a system that encapsulates a database management system functioning as the persistent data layer and the persistent medium. The access to the persistent medium is conducted by the database management system and it is completely hidden from the point of view of the objects to be stored. However, additional measures have to be taken in order to convert the objects from their internal run-time representation into a format suitable for the object oriented database. Especially, in case the objects contain data fields of a variable length, the conversion process from the run-time representation into a database representation of the objects adds additional overhead to the object oriented environment. Such overhead might reduce the performance of a system running in such an environment drastically. This holds true especially for systems frequently storing modified or newly created objects.

OBJECT OF THE INVENTION

It is therefore an object of the present invention to present a method and a system that offers persistence in an dynamically changing object oriented environment having at the same time an improved performance.

BRIEF SUMMARY OF THE INVENTION

The foregoing object is achieved by a method and a system for persistently storing and restoring persistently stored objects of an object oriented environment established on a computer system having a volatile memory and a persistent storage.

First, pieces of memory, referred to as "segments" are allocated in the volatile memory. Then, a first list is created that contains first references to the segments. The first list is also called "segment map", since it allows to find every segment placed in that volatile memory. The segments are further divided into blocks. The blocks are indicated by second references. The second references are stored in a newly created second list, also referred to as "object map".

In order to store an object present in the volatile memory, a block is allocated. Then an object description is created by saving the object's values of the variables belonging to its class into the allocated block. After saving the object description in the allocated block, a new element is added to the second list containing the particular reference to said created object description. Then, the references of the object descriptions of all other objects referenced in the present object are determined. These references to other objects are stored in the created object descriptions by setting the address of the referenced object description as the reference in the created object description. Finally, the second list (object map), the segments referenced by the first list (segment map) and the first list (segment map) are stored on said persistent storage.

The object persistently stored in the above way are retrieved and recreated according to the following steps. The first list (segment map) containing the first references to the segments and all segments referenced by said first references are retrieved from the persistent storage and stored in the volatile memory. The difference between the old memory address at which the segment used to reside in the volatile memory and the new memory address at which said segment now resides in the volatile memory is stored in the first list (segment map). Of course, the old memory address was persistently stored in the first place.

Then, the second list (object map) containing the second references to the blocks are retrieved from said persistent storage. For each element of the second list, the segment that contains the block referenced by a particular element of said second list (object map) is determined. Then a new object is created in said volatile memory and the new address of said created object is saved in said second list (object map). Then, the new object is initialized with the values taken from the object description and the new addresses of the objects referenced by the newly created object are determined and the new address is set as the reference in the newly created object.

BRIEF DESCRIPTION OF THE SEVERAL VIEWS OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 1:
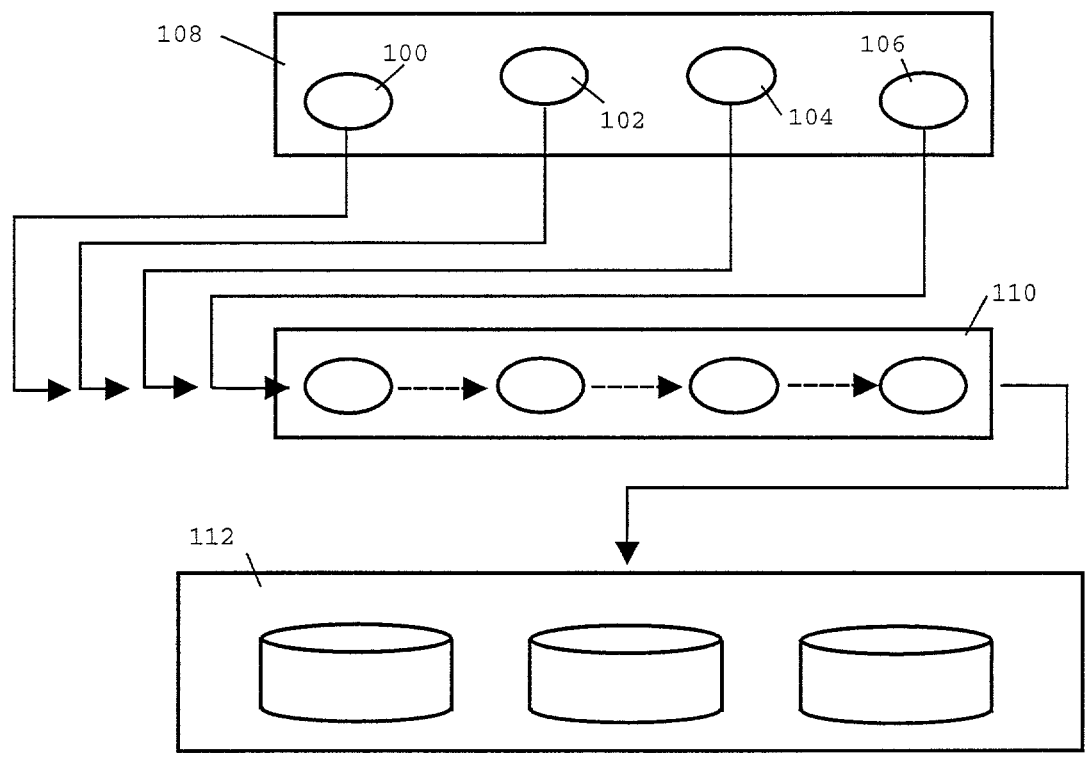
FIG. 1 shows a high level block diagram of a first known concept for persistently storing objects of an object oriented environment.

With reference to FIG. 1, there is depicted a high level block diagram of a first known concept of an object oriented environment. Four objects 100, 102, 104 and 106 are grouped together in an object layer 108 illustrated by a rectangle including the four objects 100 to 106. In the object layer 108, objects can be accessed directly by an application running in the object oriented environment. In order to store the objects 100 to 106 persistently, they get serialized into a stream 110. The serialization process is performed in a Persistent Data Layer (PDL) which functions as an interface between the object layer 108 and a persistent medium 112, into which the stream 110 gets written. The persistent medium 112 is formed by, e.g., a data base, a file or a queue. The concept for persistently storing objects according to FIG. 1 is an example for a static persistence, i.e., after storing the objects loose their accessibility.

Figure 2:
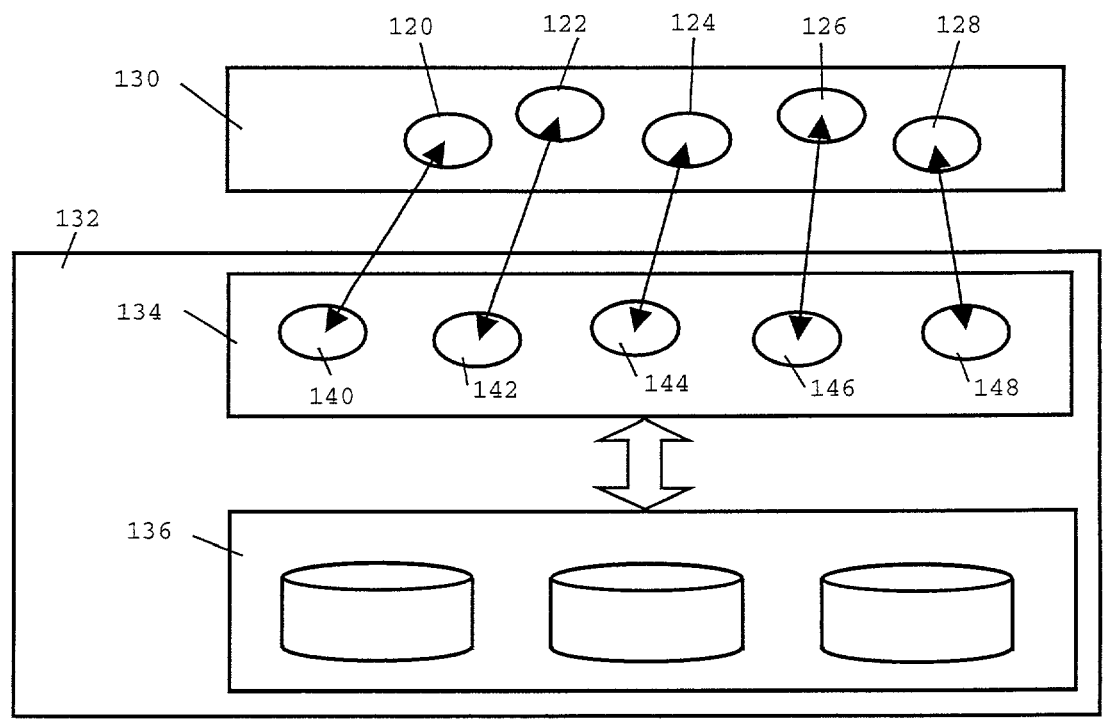
FIG. 2 shows a high level block diagram of a second known concept for persistently storing objects of an object oriented environment.

A second known concept for persistently storing objects of an object oriented environment is now described with reference to FIG. 2. There is depicted a high level block diagram of the second known concept. Five objects 120, 122, 124, 126 and 128 are grouped together in an object layer 130 illustrated by a rectangle surrounding the objects 120 to 128. The objects 120 to 128 are stored in an object oriented database 132, i.e., a system that encapsulates a database management system 134 functioning as the persistent data layer and a persistent medium 136. Each of the objects 120 to 128 has got a representation 140 to 148 in the database management system 134. The access to the persistent medium 136 is conducted by the database management system 134 and it is completely hidden from the point of view of the objects 120 to 128 to be stored.

Figure 3:
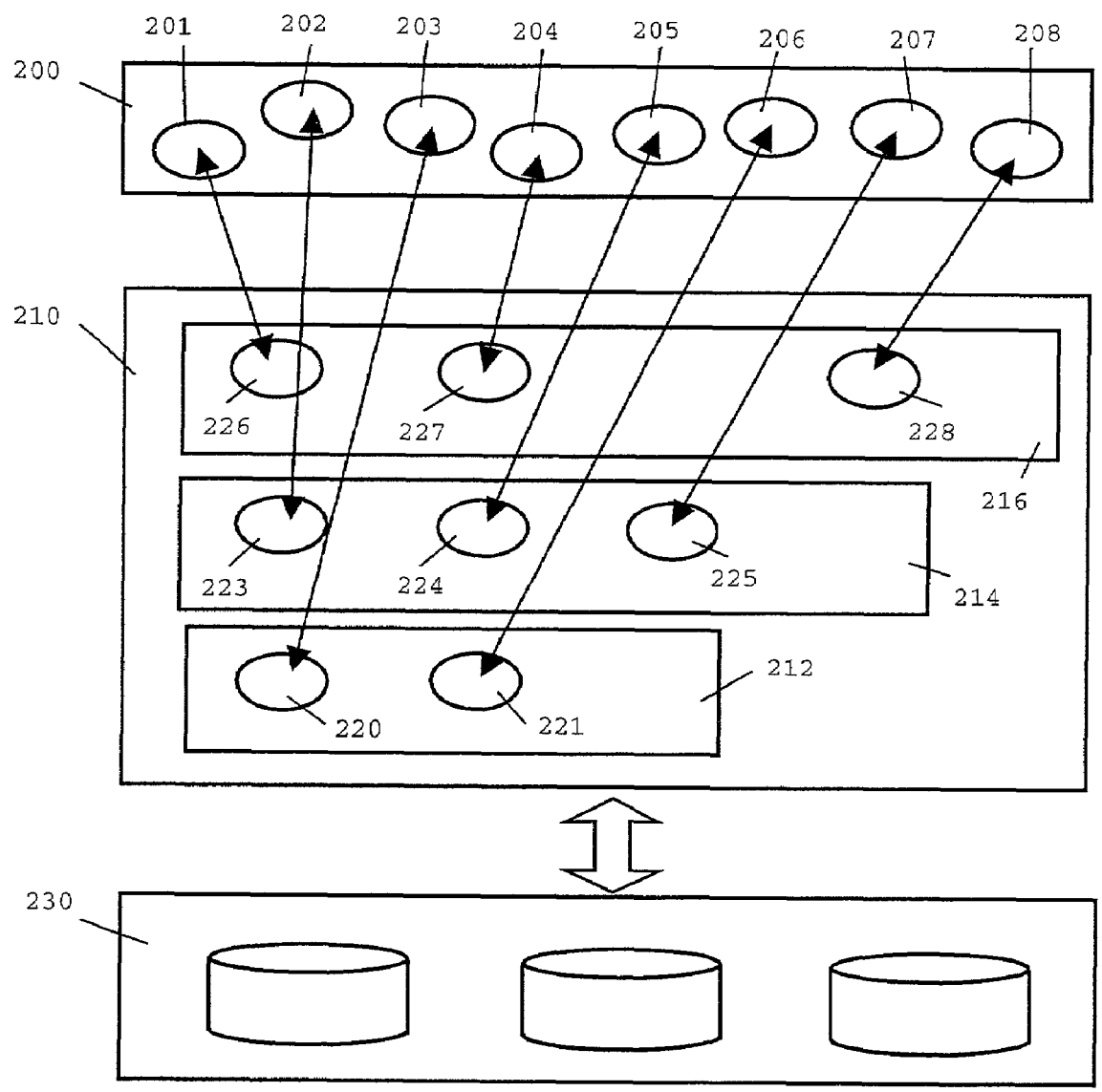
FIG. 3 shows a high level block diagram of a concept in accordance with the present invention for persistently storing objects of an object oriented environment.

Now with reference to FIG. 3, there is depicted a high level block diagram of a system in accordance with the present invention for persistently storing objects of an object oriented environment established on a computer system having a volatile memory and a persistent storage. An object layer illustrated by rectangle 200 includes objects 201 to 208. The object layer resides in the volatile memory. In the present system the persistent data layer is formed by a segment image 210. The segment image 210 is formed by a first segment 212, a second segment 214 and a third segment 216. It is acknowledged, that there can be any number of segments forming a segment image.

Each segment keeps a representation of one or more objects. Segment 212 keeps a representation 220 of object 203 and a representation 221 of object 206, whereas segment 214 keeps representations 223, 224 and 225 corresponding to objects 202, 205 and 207 and segment 216 keeps representations 226, 227 and 228 corresponding to objects 201, 204 and 208. All the segments forming the segment image are stored into a persistent medium 230, such as a data base, files, queues. The persistent medium is realized by utilizing a persistent storage.

Due to the provision of the segment image 210 a complicated database management system forming the persistent data layer can be omitted. According to the present invention the role of the persistent data layer is basically taken over by the segments 212 to 216 in which the objects get stored.

Before an object can be persistently stored a few steps are necessary that provide a respective infrastructure. First, pieces of memory are allocated in the volatile memory. The pieces of memory are used to store segments. Each segment is subdivided into a plurality of portions, so called blocks. Preferably, the blocks of one segment are of the same size. However, different sized segments and different sized blocks are provided to allow storing of different sized data in a space saving manner.

In order to keep track of all segments allocated in the volatile memory a first list gets created that contains first references, referring to the segments. This is for example implemented by pointers to the address at which the respective segment is stored in the volatile memory. Besides being used for keeping track of the allocated memory, the first list is used to recreate the object structure and the objects getting persistently stored. Since the first list allows to navigate through all segments, it will be called "segment map" in the following.

Although the segment map can be seen as an ordinary list, for performance reasons, the list is at least indexed and, preferably, realized in a tree structure. A tree is a graph wherein there is only one route between any pair of nodes, and there is a notion of "toward top of the tree", i.e. the root node, and its opposite direction, toward the leaves. Advantageously, the tree structure follows the structure of a B-tree. The concept of the B-trees are, for example, explained in D. E. Knuth—"The Art of Computer Programming, Vol. 3, Sorting and Searching", pp. 482-491, Addison-Wesley, 1973.

The blocks are used to keep a representation of an object. However, the representation of an object might be kept in more than one block, but at least one block is used to keep a representations of an object. In order to keep track of all objects stored in different blocks, a second list is created. The second list contains second references, referring to the blocks. This is for example implemented by pointers to the address at which the respective block is stored in the volatile memory. Besides being used for keeping track of the blocks containing information about the objects, the second list is used to recreate the object structure and the objects getting persistently stored. By keeping a reference to the blocks containing information about the objects, the second list keeps references to every single object at the same time. Since the second list keeps a reference to every single object stored it will be called "object map" in the following.

After the allocation of a segment, all blocks are available to be seized for storing information, such as an object description. In order to keep track of all available blocks, these blocks get concatenated in a linked list. The blocks being taken to store information are removed from the linked list, since, in return, references to such blocks are stored either in the object map and/or in the object description. Preferably, blocks of different block size exists and they are grouped in different linked lists, e.g., a linked list for blocks that can keep 50 bytes, 70 bytes or 150 bytes. The different linked lists containing the available blocks are called "regions". To distinguish the different block size, they are referred to as "region 50", "region 70" and "region 150" respectively.

The object map can as well be seen as an ordinary list, for performance reasons, however, the list is at least indexed and, preferably, realized in a tree structure. Advantageously, the tree structure follows the structure of a B-tree. Although it is possible to store the object descriptions of all objects in one single object map, for performance reasons, one object map is created for each kind of object, i.e., for each class.

The whole process of saving data according to the present invention starts together with the start of the system running in an object oriented environment in which the process is implemented and it keeps on running as long as the system operates. All modifications to the object, i.e., the state of the objects, are continuously monitored and registered. At predetermined check points all modifications get stored to the persistent storage. The check points can be chosen according to different requirements, e.g., the completion of a transaction, the expiry of a time limit or the reaching of an amount of modifications. After a restart of the object oriented environment the state of the objects can be recreated as it was at the point at which the last checkpoint occurred.

In the following it is assumed that the segment map and the object maps are implemented following the structure of a tree.

Figure 4:
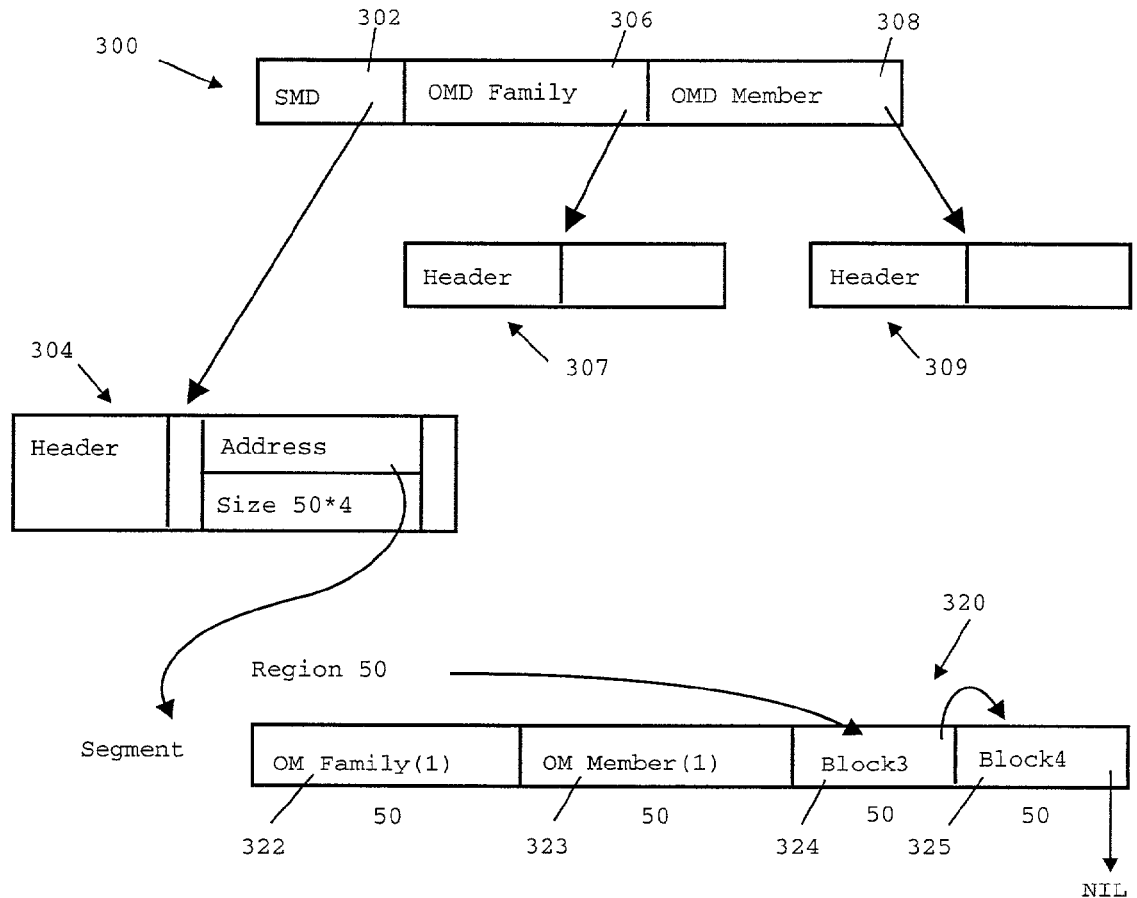
FIG. 4 shows a data structure of an object oriented environment at the beginning of a process of persistently storing objects according to the present invention.

Now with reference to FIG. 4, there is depicted a data structure of an object oriented environment at the beginning of a process of persistently storing objects according to the present invention. On starting of the object oriented environment, an image descriptor 300 is created containing a segment map descriptor 302 (SMD), i.e., a reference to a segment map 304, and a first object map descriptor 306 (OMD) that references a first object map 307 (OM) and a second object map descriptor 308 that references a second object map 309. The first object map 307 stores references to objects of the class "Family", whereas the second object map 309 stores references to objects of the class "Member".

The initially existing first and second object maps 307 and 309 as described above only consists of one empty leave. However, in order to store the structure formed by the image descriptor 300 and the first and second object maps 307 and 309, a segment 320 is allocated in the volatile memory consisting of a first, a second, a third and a fourth block 322, 323, 324 and 325, each provided for keeping 50 bytes of data. As aforementioned, the address of the segment 320 is stored in the segment map 304.

The first object map 307 is actually stored in the first block 322 and the second object map 309 is stored in the second block 323. Therefore, the first object map descriptor 306 is formed by a pointer to the memory address at which the first block 322 begins in the segment 320 and the second object map descriptor 308 is formed by a pointer to the memory address at which the second block 323 begins in the segment 320. The remaining blocks, i.e., the third and the fourth block 324 and 325 which are still free are part of a linked list "region 50" as already explained above. In case the number of blocks provided by the segment is not sufficient to take all object maps, another segment gets allocated. Accordingly, the segment map is completed to also reference the newly allocated segment (not shown). At any time, the segment map 304 consists of as many elements as segments are allocated.

The segment map 304 and the object maps 307 and 309 include a header portion that contains data necessary to build a tree structure, such as a reference to the parent node and references to child nodes. Both, the segment map and the object maps are extended by creating a new element and incorporating it into the tree structure.

Whenever a new object is created, an object description is created as well. All variables having a fixed length are stored directly in the object description. The following data types might be included in an object description. First of all, raw data, i.e., data that are directly stored in the object description, such as integers, Boolean, real numbers, characters and strings. Furthermore, the object description might comprise references referring to other objects, object descriptions or other data structures. Such references can, for example, be formed by pointers, addresses or indexes. Sections and references to other object descriptions also belong to this group which are used to reflect the dependencies between objects and to store certain kinds of variables of the objects. Besides storing a representation of an object, sections are also used to store variables having a variable length. References to other object descriptions allow to store relations between objects.

Figure 5:
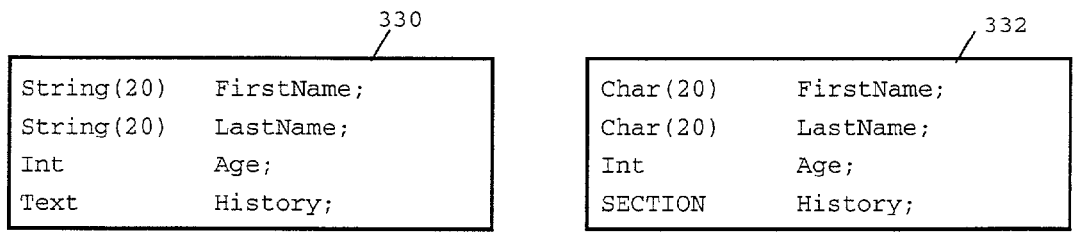
FIG. 5 shows an example of the structure of an object and the respective representation of the object in form of an object description according to the present invention.

FIG. 5 shows an example of the structure of an object 330 and the respective representation of the object in form of an object description 332. The object 330 consists of a first string "First Name", a second string "LastName" both having the length of 20 characters, an integer value "Age" and a text field "History", whereby the text field is a character string having a variable length. The representation of such data structure is shown in the object description 332. The strings "FirstName" and "LastName" are represented by a first one-dimensional character array "FirstName" and a second one-dimensional character array "LastName" respectively. The integer "Age" can be found as an integer having the same name in the object description, whereas the text field "History" has been converted to a section "History".

In order to store the variable length text field "History" in a section, the text field gets divided in chunks of, e.g., 50 bytes. Each of the chunks are then stored in one block provided for storing 50 bytes.

Returning to the example shown in FIG. 4, assuming the object types or classes of the system are defined as follows (the asterisk "*" mark references):

| Family { | |
| --- | --- |
| Text | History; |
| *Father | Fath; |
| *Mother | Moth; |
| *Child | Chld; |
| }; | |
| Member { | |
| Enum | Role = {Father, Mother, Child}; |
| String (20) | FirstName; |
| Int | Age; |
| *Family | Fam; |
| }; | |
| Four objects get created: | |
| Family | Schwarz; |
| Member | Member1, Member2, Member3; |

Then, the object descriptions get created:

| Schwarz OD | Section | History 150 |
| --- | --- | --- |
| Member1 OD | Father | |
| | Max | |
| | 30 | |
| | *Schwarz OD | |
| Member2 OD | Mother | |
| | Maria | |
| | 28 | |
| | *Schwarz OD | |
| Member3 OD | Child | |
| | Eric | |
| | 4 | |
| | *Schwarz OD | |

The fixed length data are saved in the object descriptions. The data having a variable length, here the field "History", is stored in sections. It should be noticed that the references to the family members defined in the object type "Family" are not listed in the object description of object "Schwarz." This is done in order to avoid cyclic dependencies. According to the suggested method, all data get stored without being forced to perform complicated dependency checks. In the present case, during recreation of all objects, first, all objects of the type "Family" get recreated and then the objects of the type "Member".

Figure 6:
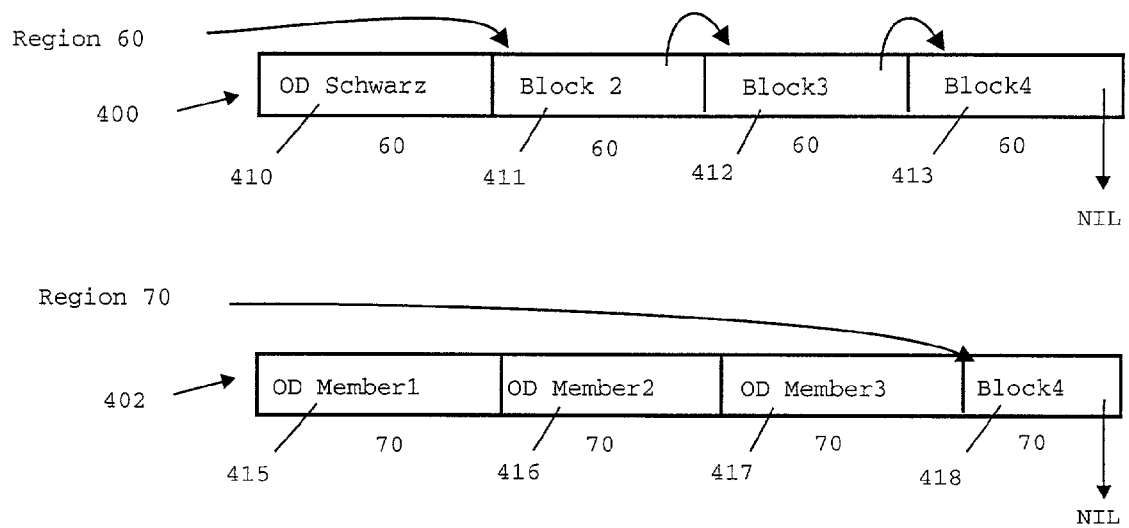
FIG. 6 shows a block diagram illustrating the data structure of the four object descriptions being saved in a first segment and a second segment according to the present invention.

Now with reference to FIG. 6, there is depicted a block diagram illustrating the data structure of the four object descriptions being saved in a first segment 400 and a second segment 402. The first segment 400 consists of a first, a second, a third and a fourth block 410, 411, 412 and 413 each provided for keeping 60 bytes of data. The second segment 402 consists of a fifth, a sixth, a seventh and an eighth block 415, 416, 417 and 418 each provided for keeping 70 bytes of data.

The object description "Schwarz" fits in one of the blocks of the first segment. Therefore, the first block 410 is allocated to keep the object description "Schwarz". The remaining blocks 411, 412, 413 of the first segment stay empty at this point. Thus, they are still in the linked list of "Region 60". The object description for the object type "Member" fits in one of the blocks of the second segment. Therefore, the fifth block 415 is allocated to keep the object description "Member1", the sixth block 416 is allocated to keep the object description "Member2" and the seventh block 417 is allocated to keep the object description "Member3." The remaining eighth block 418 of the second segment stays empty at this point. Therefore, it is still in the linked list of "Region 70."

The variable "History" having a variable length is stored in a section. The section comprises a number of blocks which are necessary to store all of the variable's contents. Assuming, that the variable "History" has got a length of 150 bytes and it is stored in blocks providing 50 bytes storage space each, then three such blocks are needed.

Figure 7:
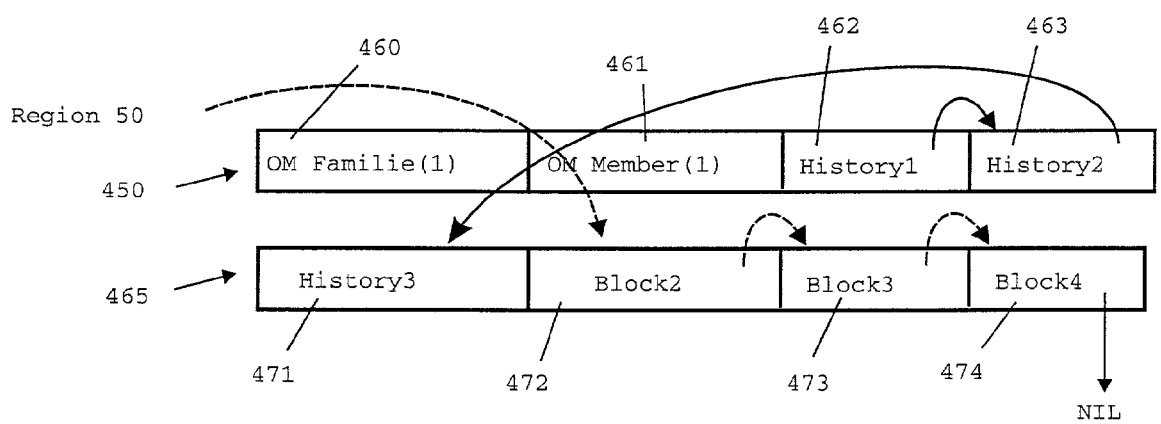
FIG. 7 shows a block diagram illustrating the data structure of a region after the variable "History" has been stored according to the present invention.

In FIG. 7, a block diagram is shown illustrating the data structure of a region 50 after the variable "History" has been stored. A first segment 450 consists of a first, a second, a third and a fourth block 460, 461, 462 and 463 each provided for keeping 50 bytes of data. A second segment 465 consists of a fifth, a sixth, a seventh and an eighth block 471, 472, 473 and 474 each provided for keeping 50 bytes of data as well.

The first block 460 is occupied by the object map "Family" and the second the second block 462 is occupied by the object map "Member" as shown in FIG. 4. The remaining blocks 462 and 463 of the first segment 450 are taken for storing the first two of three chunks of the variable "History". For the third chunk of the variable "History" the second segment 465 has been allocated. The fifth block 471 being part of the second segment 465 keeps the third chunk of the variable "History". The chunks of the variable "History" are stored in a linked list. The end of the linked list is reached, if the pointer of an element of the linked list, i.e., a block, does not reference a valid address, but a null pointer "NIL" instead. The remaining blocks 472 to 474 of the second segment 465 are still not taken. Therefore, they are listed in the linked list "Region 50" keeping all available blocks providing the length of 50 bytes.

After having created and persistently stored new objects according to the method as explained above, it is now discussed how persistently stored objects get deleted according to the present invention. In order to delete an stored object, first, the object description is checked whether there are variables having a variable length that are stored in sections. If yes, all blocks allocated by the section are released and returned to the linked list of the respective region. Then, the block keeping the object description is released and returned to the linked list of its respective region. Finally, the reference to the removed object description is deleted from the object map.

If a segment contains only blocks that are not currently used, then the whole segment is released, i.e., the allocated memory is freed. At the same time, the reference to the released segment is removed from the segment map. In order to simplify the procedure of recognizing segments only consisting of unused blocks, there is a counter that counts the number of allocated blocks. It gets maintained whenever a block gets allocated or released. Thus, only the value of this counter needs to get checked to determine whether there are still used blocks in a segment.

Another function provided by the method according to the present invention is the ability to modify directly the representation of object persistently stored. As aforementioned, the modified objects get stored at certain checkpoints. In the meantime, all changes to objects are registered. First of all, a list of objects is maintained the object descriptions of which need to be updated. Furthermore, all segments to be changed get listed, and, finally, all elements building the segment map.

When reaching the next checkpoint, all of the changes registered since the last checkpoint are written to the persistent medium. This allows to write all changes to one particular segment at the same time. Leading to a better performance. Changes to the object map is not necessary, since there are no new or deleted object in this case.

In the following, it is discussed how persistently stored objects get retrieved and recreated according to the present invention. All information that are initially necessary to start the recreation process are stored in the image descriptor as explained above. The image descriptor is stored on the persistent medium, e.g., in a data file the name of which is the key to find the correct image descriptor.

First of all, the image descriptor is retrieved from the persistent storage and loaded into the volatile memory. Thus, the segment map descriptor and the object map descriptors are known. Then, before caring about the object map, the segment map is recreated. From the persistent storage all elements forming the segment map are retrieved. In the volatile memory the B-tree structure is rebuild. After having recreated the segment map containing first references to all segments that are stored on said persistent storage, the segments itself are retrieved from the persistent storage and stored in the volatile memory. The segments might also be stored in a file.

The segment map provides the information of the old memory address at which the segment used to reside in the volatile memory. By allocating new memory spaces to store the segments retrieved from the volatile memory, new memory addresses at which the segment are actually stored is known. The difference between the old memory address and the new memory address is calculated for each segment and stored in the segment map.

Then, the object map is retrieved from said persistent storage, in order to rebuild the B-tree that forms the object map containing second references to blocks keeping the object descriptions. In the following, all the different objects need to be recreated. This is done by determining the segment that contains the block referenced by a particular element of the object map, creating a new object in the volatile memory and saving the new address of said created object in the object map, and initializing the new object with the values taken from the object description.

Then, in order to recreate the references from one object to another, the new addresses of objects referenced by the newly created object are determined and set as the reference in the newly created object.

Furthermore, the variables having a variable length are restored. As explained above such variables are stored in sections. First, one or more blocks are allocated in the volatile memory that allows to keep the actual value of the variable having a variable length. Then, a linked list consisting of the blocks is created and the value of the variable is saved into the blocks forming the linked list. Finally, a reference to the head of the linked list is stored in the respective object description.

Whenever a segment needs be determined that contains a particular block referenced by an element of the object map, the new address of the requested block is calculated by adding the reference referring to the requested block that corresponds to the old memory address and the difference between said old memory address and said new memory address. This allows to directly access the memory space where the newly created block resides.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for restoring a persistently stored object of an object oriented environment established on a computer system having a volatile memory and a persistent storage, the method comprising steps of:

retrieving from said persistent storage a first list of first references to segments stored in said persistent storage;

retrieving all segments referenced in the first list and storing the segments in said volatile memory;

saving in said first list a difference between an old memory address at which the segment used to reside in the volatile memory and a new memory address at which said segment is currently stored;

retrieving from said persistent storage a second list of second references to blocks, wherein the blocks are portions of segments and whereby at least one of said blocks contains an object description;

determining, from the second list, which segment contains the block where the object description of the persistently stored object is located;

having determined the segment in which the object description of the persistently stored object resides, retrieving the objection description;

creating a first object in said volatile memory using said object description retrieved from said segment; and
saving a new address of said first object in said second list in volatile memory;
initializing said first object with values taken from said object description;
determining the address of a second object description of a second object referenced in said first object; and
setting the address of said second object description as a reference in the object description of the first object.

2. The method according to claim 1, whereby said first list and/or said second list are ordered lists.

3. The method according to claim 1, whereby said first list and/or said second list are organized as a B-tree.

4. The method according to claim 2, whereby elements of said first list are indexed by said first references.

5. The method according to claim 1, whereby each of said first references corresponds to the old memory address at which the segment used to reside in the volatile memory.

6. The method according to claim 2, whereby elements of said second list are indexed by said second references.

7. The method according to claim 1, whereby each of said second references corresponds to an old memory address at which the block used to reside in said volatile memory.

8. The method according to claim 1, whereby said first and second object descriptions are formed by a collection of values owned by an object for variables belonging to its class.

9. The method according to claim 1, whereby for each value in said first and second object descriptions of variables having a variable length, the method further comprising steps of:
allocating a number of blocks, such that an actual value of the variable having a variable length can be kept variable;
creating a linked list of said number of blocks;
saving said value into said number of blocks; and
storing a reference to the head of the linked list in said first and second object descriptions.

10. The method according to claim 2, whereby determining the segment that contains said block referenced by a particular element of said second list comprises the step of searching in said first ordered list for the segment that contains said portion of said segment referenced by said element.

11. The method according to claim 1, whereby determining the segment that contains said block referenced by a particular element of said second list further comprises the step of calculating the new address by adding the reference to said block, that corresponds to the old memory address, and said difference between said old memory address and said new memory address.

12. The method according to claim 1, whereby determining new addresses of objects referenced by a newly created object comprises the step of searching in said second list for the element that contains the new address of the referenced object, that is referenced by the old address of the respective object description.

13. The method according to claim 1, whereby said first list and/or said second list is a linked list, and whereby for all references to heads of the linked list the method further comprising the steps of:
reading all blocks of said linked list;
allocating memory to store the value of the variable retrieved from the linked list; and
storing the value in said allocated memory.

14. A method for persistently storing objects of an object-oriented environment established on a computer system having a volatile memory and a persistent storage, the method comprising steps of:
allocating a plurality of segments in said volatile memory;
creating a first list of first references to said segments;
creating a second list of second references to blocks, wherein the blocks are portions of said segments;
allocating a block of one of said segments;
creating a first object description for a first object, wherein the first object description comprises values of variables belonging to the first object's class;
storing the first object description into said allocated block;
saving a new address of said first object description in the second list, wherein the new address is a memory address of said allocated block in the volatile memory where the first object description is stored;
adding reference to said first object description to the second list;
determining the address of a second object description of a second object referenced in said first object description;
setting the address of said second object description as a reference in the created first object description;
storing said second list on said persistent storage;
storing the plurality of segments referenced by said first list on said persistent storage; and
storing said first list on said persistent storage.

15. The method according to claim 14, whereby said first list and/or said second list are ordered lists.

16. The method according to claim 14, whereby said first list or said second list are organized as a B-tree.

17. The method according to claim 16, whereby elements of said first list are indexed by said first references.

18. The method according to claim 14, whereby each of said first references corresponds to the current memory address at which the segment resides in the volatile memory.

19. The method according to claim 15, whereby elements of said second list are indexed by said second references.

20. The method according to claim 14, whereby each of said second references corresponds to the current memory address at which the block resides in said volatile memory.

21. The method according to claim 19, whereby determining an address of an object description of another object referenced in said first object comprises the step of searching in said second ordered list for the element that contains the address of the object description of the another object.

22. The method according to claim 21, whereby determining the address of the object description of another object referenced in said first object further comprises a step of using a reference to the another object description provided by each object in said second ordered list.

23. The method according to claim 14, whereby for each value of the variables having a variable length the method further comprises steps of:
allocating a number of portions of one of said segments of memory such that an actual value of the variable length can be kept variable;
creating a linked list of said number of portions;
saving the values of the variables into said number of portions; and
storing a reference to a head of the linked list in said object description.

24. A computer program product stored on a computer usable medium, comprising computer readable program instructions for:

allocating a plurality of segments in volatile memory;
creating a first list of first references to said segments;
creating a second list of second-references to blocks, wherein the blocks are portions of said segments;
allocating a block of one of said segments,
creating a first object description of a first object, wherein the first object description comprises values of variables belonging to the first object's class;
storing the first object description into said allocated block;
saving a new address of said first object description in the second list, wherein the new address is a memory address of said allocated block in the volatile memory where the first object description is stored;
adding a reference to the first object description to the second list;
determining the address of a second object description of a second object referenced in said first object description;
setting the address of said second object description as a reference in the created first object description;
storing said second list on persistent storage;
storing the plurality of segments referenced by said first list on said persistent storage; and
storing said first list on said persistent storage.

* * * * *